(12) United States Patent
D'Souza et al.

(10) Patent No.: US 7,986,935 B1
(45) Date of Patent: Jul. 26, 2011

(54) SERVICE PLAN OPTIMIZER

(75) Inventors: Anita D'Souza, Overland Park, KS (US); Edwin Madigan, Olathe, KS (US); Susan Moore, Bucyrus, KS (US); Anitha Narayan, Bucyrus, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 921 days.

(21) Appl. No.: 11/924,860

(22) Filed: Oct. 26, 2007

(51) Int. Cl.
*H04M 11/00* (2006.01)

(52) U.S. Cl. ............... 455/406; 455/405; 455/550.1; 379/114.02; 705/34

(58) Field of Classification Search ............... 455/406, 455/405, 550.1; 379/114.02; 705/34
See application file for complete search history.

(56) References Cited

U.S. PATENT DOCUMENTS

| | | | |
|---|---|---|---|
| 4,910,672 A | 3/1990 | Off et al. | |
| 5,907,800 A | 5/1999 | Johnson et al. | |
| 5,991,376 A | 11/1999 | Hennessy et al. | |
| 6,049,599 A | 4/2000 | McCausland et al. | |
| 6,052,447 A | 4/2000 | Golden et al. | |
| 6,301,471 B1 | 10/2001 | Dahm et al. | |
| 6,438,579 B1 | 8/2002 | Hosken | |
| 7,761,083 B2 * | 7/2010 | Marsh et al. | 455/406 |
| 2001/0016831 A1 * | 8/2001 | Marsh et al. | 705/34 |
| 2001/0041988 A1 | 11/2001 | Lin | |
| 2002/0198782 A1 | 12/2002 | Shorter | |
| 2003/0200135 A1 | 10/2003 | Wright | |
| 2004/0009762 A1 | 1/2004 | Bugiu et al. | |
| 2004/0097245 A1 | 5/2004 | Sheth et al. | |
| 2005/0233733 A1 | 10/2005 | Roundtree et al. | |
| 2006/0014519 A1 * | 1/2006 | Marsh et al. | 455/406 |
| 2007/0060099 A1 | 3/2007 | Ramer et al. | |
| 2007/0156673 A1 | 7/2007 | Maga et al. | |
| 2008/0233944 A1 * | 9/2008 | Tu | 455/421 |

OTHER PUBLICATIONS

Office Action dated Apr. 15, 2009, U.S. Appl. No. 11/617,705, filed Dec. 28, 2006.
Final Office Action dated Sep. 15, 2009, U.S. Appl. No. 11/617,705, filed Dec. 28, 2006.
Advisory Action dated Dec. 9, 2009, U.S. Appl. No. 11/617,705, filed Dec. 28, 2006.
Office Action dated Feb. 3, 2010, U.S. Appl. No. 11/617,705, filed Dec. 28, 2006.
Final Office Action dated Jul. 20, 2010, U.S. Appl. No. 11/617,705, filed Dec. 28, 2006.

* cited by examiner

*Primary Examiner* — Danh C Le

(57) ABSTRACT

A service plan optimizer is provided. The service plan optimizer includes a storage device, a processor, an optimizer engine, and a user interface. The storage device stores usage data for a communication device. The optimizer engine is executed by the processor to compare a current service plan for the communication device with available service plans based on the stored usage data. The optimizer engine is also executed by the processor to form a recommendation based on the comparison. The user interface displays the recommendation.

18 Claims, 7 Drawing Sheets

200

| Select Your Usage History | |
|---|---|
| Bill Date 202 | Bill Period 204 |
| Feb. 10, 2006 | Jan. 10, 2006 to Feb. 09, 2006 |
| Mar. 10, 2006 | Feb. 10, 2006 to Mar. 09, 2006 |
| Apr. 10, 2006 | Mar. 10, 2006 to Apr. 09, 2006 |
| May 10, 2006 | Apr. 10, 2006 to May 09, 2006 |
| Jun. 10, 2006 | May 10, 2006 to Jun. 09, 2006 |
| Jul. 10, 2006 | Jun. 10, 2006 to Jul. 09, 2006 |
| Aug. 10, 2006 | Jul. 10, 2006 to Aug. 09, 2006 |
| Sep. 10, 2006 | Aug. 10, 2006 to Sep. 09, 2006 |
| Oct. 10, 2006 | Sep. 10, 2006 to Oct. 09, 2006 |
| Nov. 10, 2006 | Oct. 10, 2006 to Nov. 09, 2006 |
| Dec. 10, 2006 | Nov. 10, 2006 to Dec. 09, 2006 |
| Jan. 10, 2007 | Dec. 10, 2006 to Jan. 09, 2007 |

| Plan Details 302 | Current Plan 304 | Recommended Plan 306 |
|---|---|---|
| Name 308 | 700 Plan | 900 Plan |
| | Additional Spending: | Savings: |
| | Average Overage $35.00 | |
| | Average Roaming $6.00 | |
| Comparison 310 | Total $41.00 | Monthly $65.01 |
| | | Yearly $780.12 |
| | | |
| Select 312 | Return to Usage History | Change to This Plan |
| | | |
| Total Monthly Cost 314 | Plan and Add-Ons $94.00 | Plan and Add-Ons $69.99 |
| Plan cost (per month) 316 | 700 Anytime Minutes $60.00 | 900 Anytime Minutes $59.99 |
| Add a Phone 318 | 4 Lines $30.00 | 4 Lines $30.00 |
| Night and Weekend Minutes 320 | Unlimited – Starting at 9 p.m. 5 Lines $5.00 | Unlimited – Starting at 7 p.m. 5 Lines Included |
| Mobile to Mobile 322 | Unlimited – 3 Lines $5.00 | Unlimited – 3 Lines Included |
| Data Pack 324 | PCS Vision Unlimited – 3 Lines $30.00 PCS Picture Mail Unlimited – 2 Lines $10.00 | Data Pack (choose later) Unlimited – 3 Lines $30.00 Data Pack (choose later) Unlimited – 2 Lines $30.00 |
| Text Messaging 326 | 300 Text Messages 2 Lines $10.00 | 300 Text Messages 2 Lines $10.00 |
| Total Equipment Replacement 328 | $5.00 | $5.00 |
| Roadside Rescue 330 | 1 Line $5.00 | 1 Line $5.00 |
| Subscriber Agreement Expiration Date 332 | April 1, 2007 | April 1, 2009 |

SERVICE PLAN OPTIMIZER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Communication device users subscribe to service plans offered by communication service providers. A user may have difficulty in choosing between service plans due to the large numbers of features and options offered by each plan, such that the user may pay extensively for some features and options in a chosen service plan that are rarely used. A service plan that does not match the user's needs can result in excessive service plan costs and user dissatisfaction, which may lead to the user discontinuing service with their current communication service provider.

SUMMARY OF THE INVENTION

In one embodiment, the present disclosure provides a service plan optimizer. The service plan optimizer includes a storage device, a processor, an optimizer engine, and a user interface. The storage device stores usage data for a communication device. The optimizer engine is executed by the processor to compare a current service plan for the communication device with available service plans based on the stored usage data. The optimizer engine is also executed by the processor to form a recommendation based on the comparison. The user interface displays the recommendation.

In another embodiment, a computer implemented method for a service plan optimizer is provided. Usage data for a communication device is stored. The usage data is displayed. At least a portion of the usage data is selected based on a user input. A current service plan for the communication device is compared with available service plans based on the selected usage data. A recommendation is formed based on the comparison. The recommendation is displayed.

In other embodiments, a service plan optimizer is provided. The service plan optimizer includes a storage device, a user interface, a processor, and an optimizer engine. The storage device stores usage data for a group of communication devices. The user interface displays the usage data and selects at least a portion of the usage data based on a user input. The optimizer engine is executed by the processor to compare a current service plan for the group of communication devices with available service plans based on the selected usage data. The optimizer engine is also executed by the processor to form a recommendation based on the comparison. The user interface displays the recommendation.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates a graphical user interface for a usage history selection according to some embodiments of the present disclosure.

FIG. 3 illustrates a graphical user interface for a recommendation according to some embodiments of the present disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides a service plan optimizer. A storage device stores the usage data for the subscriber's communication device. An optimizer engine compares a subscriber's current service plan with available service plans based on the subscriber's actual usage data, thereby accurately estimating which available service plans would save the most money for the subscriber rather than relying upon a subscriber's inaccurate estimate of their future communication device usage. The optimizer engine forms a recommendation based on the comparison, which is displayed by a user interface to the subscriber.

The optimizer engine may compare service plans either for individual subscribers or for a group of subscribers, such as a family that subscribes to a family service plan or a business that subscribes to a office plan, with the plans offered by a communication service provider. While the service plans in the examples described below are for telephone communications, the service plans may also be for air-cards used by laptop computers or other computing devices. The subscriber may select which usage data is used for the service plan comparisons, thereby enabling the subscriber to eliminate non-representative usage data, such as usage data from the previous summer when the subscriber's children did not use their mobile phones often because they were on an untypical vacation abroad. The optimizer engine may combine stored usage data with subscriber estimates for situations when the subscriber anticipates a usage pattern that is not reflected in the stored usage data. The user interface may display multiple usage graphs to enable the subscriber to evaluate usage data in the context of the current and recommended service plans.

The recommendation may include service plans that are recommended as part of a promotional offer and opportunities to upgrade to a new communication device that is compatible with options in a recommended service plan. The optimizer engine may report to a communication service provider on how frequently different service plans and options are presented to subscribers, how much each subscription subsequently costs relative to projected subscription costs, and customer retention for subscribers.

Figure 1:
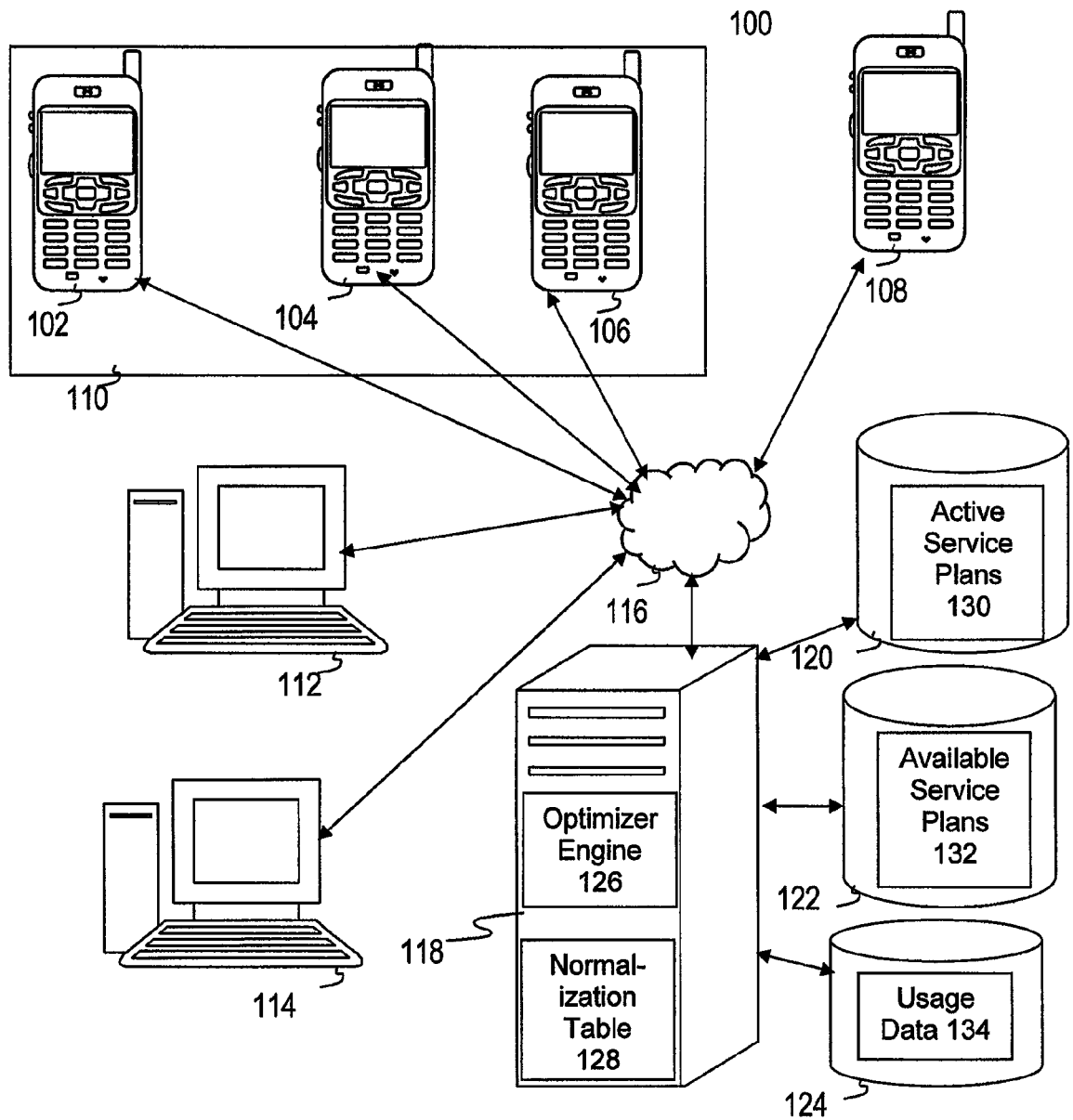
FIG. 1 is a diagram of system for a service plan optimizer according to some embodiments of the present disclosure.

Turning now to FIG. 1, a diagram of a system 100 for a service plan optimizer is depicted according to embodiments of the present disclosure. The system 100 includes communication devices 102-108, a group 110 of communication devices, user interfaces 112-114, a communication network 116, a server 118, data stores 120-124, an optimizer engine 126, a normalization table 128, active service plans 130, available service plans 132, and usage data 134. The communication devices 102-106 form the group 110 of communication devices, while the communication device 108 is not in the group 110. The user interface 112 is associated with a communication device user, while the user interface 114 is associated with a service plan optimizer administrator. The communication devices 102-108 and the user interfaces 112-114 communicate with the server 118 via the communication network 116. The server 118 includes the optimizer engine 126 and the normalization table 128. The server communicates with the data store 120, which includes the active service plans 130, the data store 122, which includes the available service plans 132, and the data store 134, which includes the usage data 134. Although depicted separately, the server 118, the data stores 120-124, and their functions may be combined together in any combination.

A communication device user may use any of the communication devices 102-106 in the group 110 or the user interface 112 to communicate with the server 118 to request a service plan recommendation for communication devices in the group 110. Additionally, another communication device user may use the communication device 108 or the user interface 112 to communicate with the server 118 to request a service plan recommendation for the communication device 108. The server 118 may respond to a request for a service plan recommendation by executing the optimizer engine 126 to retrieve the communication device user's active service plan from the active service plans 130 in the data store 120, to retrieve the available service plans 132 from the data store 122, and to retrieve the communication device user's usage data from the usage data 134 in data store 124. The optimizer engine 126 may load the active service plans, the available service plans 132, and the usage data 134 in the normalization table 128 to compare the communication user's current service plan, which is one of the active service plans 130, with the available service plans 132 based on the usage data 134. The available service plans 132 may not include some of the active service plans 130, such as when a specific active service plan will no longer be offered by the communication service provider. The optimizer engine 126 can make the comparison of the service plans based on the usage data 134, and provide a recommendation for a service plan via any user interface associated with any of the communication devices 102-108 and the user interface 112. Furthermore, the user interface 114 may report to an administrator on the recommendations provided to numerous users, such as how often the optimizer engine 126 recommended each of the available service plans 132 and each of the options available for each of the available service plans 132.

Though illustrated as a mobile phone, the communication devices 102-108 may take various forms including a personal digital assistant (PDA), a mobile computer, a digital camera, a mobile telecommunication device, a telephone, a digital music player, a mobile handset, a handheld gaming device, a wireless mobile device, a pager, a portable computer, a tablet computer, a laptop computer, a set top box, a television, and a digital calculator. Suitable communication devices may combine some or all of these functions. The communication devices 102-108 may communicate by a radio access network providing access to the communication network 116. The server 118 is connected to the communication network 116. The communication devices 102-108 communicate with the server 118 via the radio access network and the communication network 116. Other communication paths may also be used.

Figure 7:
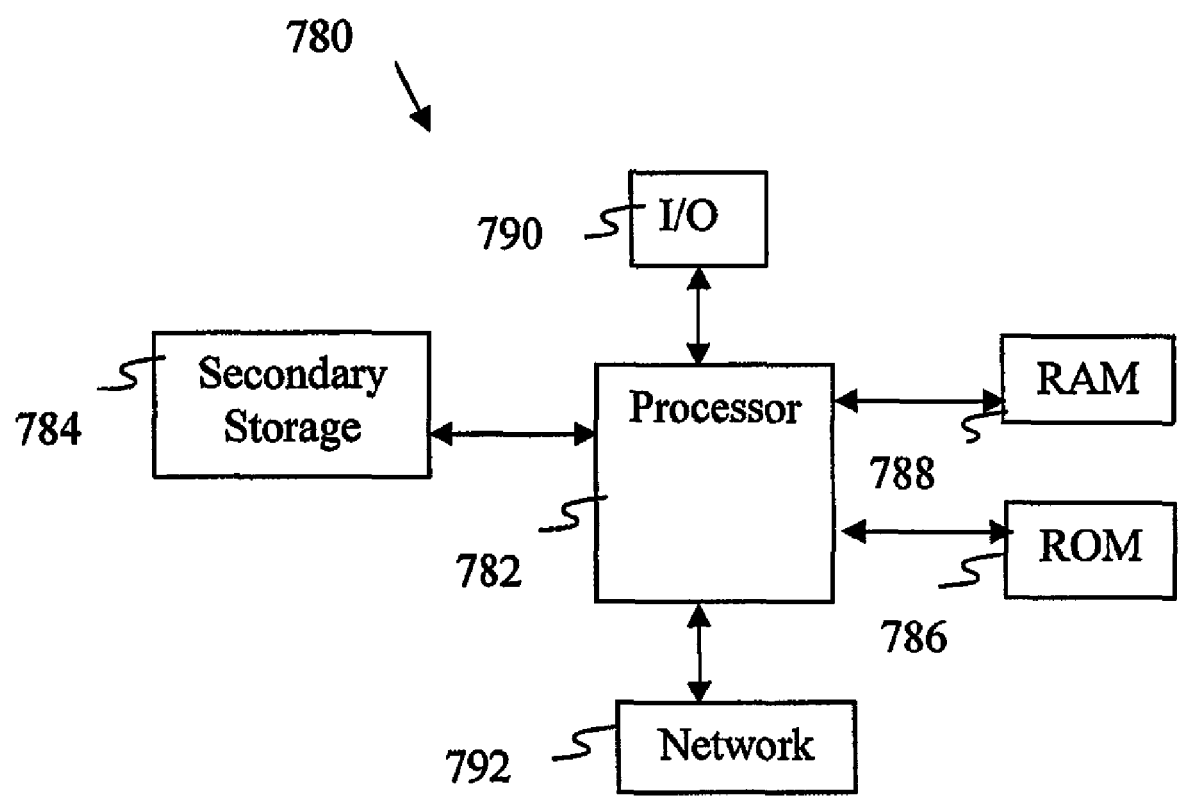
FIG. 7 illustrates an exemplary general purpose computer system suitable for implementing the several embodiments of the disclosure.

The server 118 may be implemented on a general purpose computer, which is discussed below in reference to FIG. 7. The optimizer engine 126 may be a software tool that prompts users to input data via a graphic user interface, such as a web page, associated with any of the communication devices 102-108 or the user interfaces 112-114. The optimizer engine 126 may be implemented as a software program, or a spreadsheet, or other system. The normalization table 128 may include every feature and option offered by the available service plans 132 to enable a comparison of the features and options between each of the available service plans 132. The active service plans 130 comprise data that identifies the current service plan for each subscriber to a communication service provider. The available service plans 132 comprise data that identifies each service plan that is made available by the communication service provider to each subscriber. The usage data 134 may include data associated with a customer's usage history, text messages, roaming calls, anytime minutes, mobile to mobile minutes, nighttime and weekend minutes, walkie-talkie minutes, and long distance calls. The usage data 134 may be compiled by the communication service provider for billing purposes and may be stored in a separate billing system data store, which is not depicted. The number and the types of communication devices, user interfaces, networks, servers, optimizer engines, normalization tables, data stores, and data in FIG. 1 are exemplary.

Turning now to FIG. 2, a graphical user interface (GUI) 200 for usage history selection is depicted according to some embodiments of the present disclosure. The GUI 200 includes a bill date 202 column, a bill period 204 column, a selection 206 of usage history, and a first example 208 of usage history. The GUI 200 includes rows for billing periods in the bill period 204 column that correspond to rows for billing dates that are included in the bill date 202 column. The user interface 112 may display the GUI 200 in response to a user input to produce a service plan recommendation. The GUI 200 includes the first example 208 of usage history for the bill date 202 of "Feb. 10, 2006" and the bill period of "Jan. 10, 2006 to Feb. 9, 2006." In response to viewing GUI 200, the user may choose the selection 206 of usage history because the user added a phone for a family member to the user's service plan during October 2006, and wants to compare the current service plan based on the recent additional phone usage to other service plans that also cover the additional phone for the family member.

The GUI 200 may contain selectable boxes or similar components corresponding to the data depicted in FIG. 2. A user may manually enter the selection of the usage data 134. Alternatively, the boxes may contain drop-down lists or similar components that allow a user to select the usage data 134 from predefined lists. Alternatively, a text-based or speech-based data entry system may be used for entry of usage data selections.

Turning now to FIG. 3, a graphical user interface 300 for a recommendation is depicted according to some embodiments of the present disclosure. The GUI 300 includes a plan details 302 column, a current plan 304 column, and a recommended plan 306 column. Although the GUI 300 includes only one recommended plan 306, the GUI may include numerous recommended plans, each with its own column. The GUI 300 may also include a name 308 row, comparison 310 rows, a select 312 row, a total monthly cost 314 row, a plan cost (per month) 316 row, an add a phone 318 row, a night and weekend minutes 320 row, a mobile to mobile 322 row, a data pack 324 row, a text messaging 326 row, a total equipment replacement 328 row, a roadside rescue 330 row, and a subscriber agreement expiration date 332 row. The number and the types of columns 302-306 and rows 308-332 in FIG. 3 are exemplary.

In response to a request by the user interface 112 or the communication device 102 for a service plan recommendation, the optimizer engine 126 may form the GUI 300 and send the GUI 300 to be displayed by the user interface 112 or the communication device 102. The columns 302-306 and the rows 308-332 of information enable the user of the communication device 102 to compare the current plan 304 to the recommended plan 306. For example, the name 308 of the current plan 304 column is 700 plan, which indicates that the user has 700 anytime minutes as a service plan feature. The name 308 of the recommended plan 306 is 900 plan, which indicates that the user could have 900 anytime minutes as a service plan feature. The comparison 310 for the current plan 304 indicates that the user averages $35.00 per month in overage costs and $6.00 per month in roaming costs. The comparison 310 for the recommended plan 306 indicates that the user could save $65.01 each month by selecting the recommended plan 306. The select 312 row enables the user to either return to a usage history display or to select to discontinue subscription to the current plan 304 and begin subscription to the recommended plan 306.

The rows 314-332 depict features and options for the current plan 304 and the recommended plan 306. For example, the total monthly cost 314 for the current plan 304 is $94.00 while the total monthly cost 314 for the recommended plan 306 is $69.99. The total monthly cost 314 for each plan is based on a combination of features and options, or add-ons, for each plan. The plan cost (per month) 316 for the current plan is $60.00 while the plan cost (per month) 316 for the recommended plan 306 is $59.99.

Some of the options for the current plan 304 and the recommended plan 306 may be the same. For example, the cost to add a phone 318 is $30.00 for both the current plan 304 and for the recommended plan 306. Likewise, the cost for text messaging 326 a total of 300 text messages is $10.00 for both the current plan 304 and for the recommended plan 306.

However, some of the options for the current plan 304 and the recommended plan 306 may be different, such that the usage data 134 for the current plan 304 is loaded into the normalization table 128 to accurately compare the current plan 304 and the recommended plan 306. For example, the recommended plan 306 has no additional cost for communications made mobile to mobile 322, while the current plan 304 has a cost of $5.00 for communications made mobile to mobile 322. Therefore, the normalization table 128 used as the basis for forming the GUI 300 includes a row for mobile to mobile 322 to compare the non-cost for the recommended plan 306 to the $5.00 cost for the current plan 304. Similarly, the normalization table 128 may include additional information to represent the difference between the night and weekend minutes 320 for the current plan 304 and the night and weekend minutes 320 for the recommended plan 306. Because the recommended plan 306 begins night minutes at 7 p.m. while the current plan 304 begins night minutes at 9 p.m., the normalization table 128 may store the nighttime minutes between 7 p.m. and 9 p.m. from the usage data 134 for comparison purposes. The minutes used between 7 p.m. and 9 p.m. that resulted in overage costs under the current plan 304 would not result in overage costs under the recommended plan 306.

The optimizer engine 126 combines the costs for the features and options for the rows 316-330 to produce the total monthly cost 314 for each plan and to produce the comparison 310 of additional spending for the current plan 304 and savings for the recommended plan 306. The GUI 300 also includes the subscriber agreement expiration date 332 of Apr. 1, 2007 for the current plan 304 and Apr. 1, 2009 for the recommended plan 306. The expiration date 332 informs the user that selecting the recommended plan 306 to save $65.01 each month will require an extension to the subscription date for their service plan. The GUI in FIG. 3 is depicted for the purposes of an example, as the numbers depicted could be based on different service plans.

Figure 4:
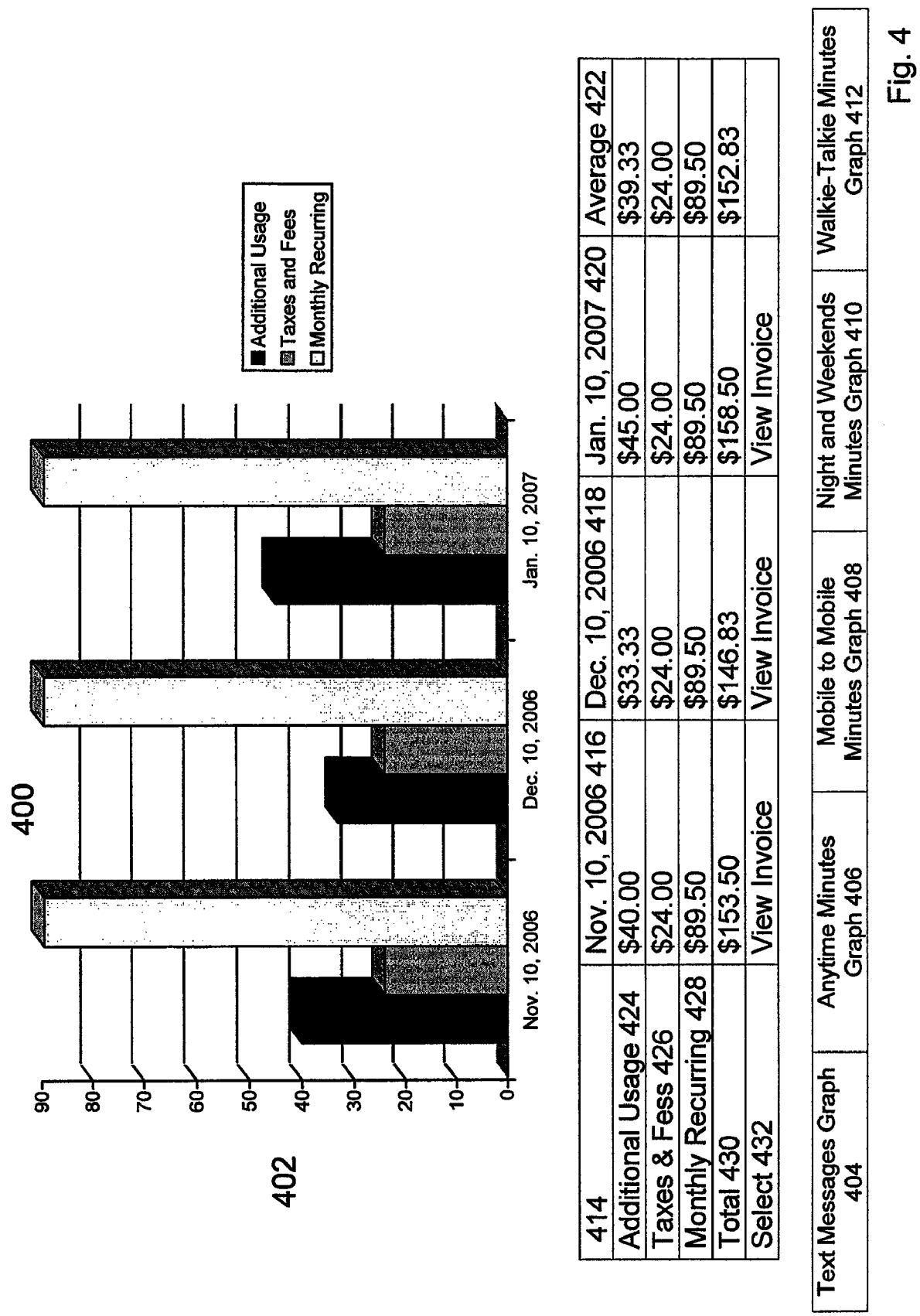
FIG. 4 illustrates a graphical user interface including multiple usage graphs according to some embodiments of the present disclosure.

Turning now to FIG. 4, a graphical user interface 400 including multiple usage graphs is depicted according to some embodiments of the present disclosure. The GUI 400 includes a costs graph 402, a text messages graph 404, an anytime minutes graph 406, a mobile to mobile minutes graph 408, a night and weekends minutes graph 410, a walkie-talkie minutes graph 412, and a legend 414 for the graph 402. The graphs 404-412 may be reduced in size relative to the costs graph 402, the same size as the costs graph 402, or simply buttons to select the viewing of the graphs 406-412. The legend 414 includes a Nov. 10, 2006 column 416, a Dec. 10, 2006 column 418, a Jan. 10, 2007 column 420, and an average 422 column. The legend 404 also includes an additional usage 424 row, a taxes & fees 426 row, a monthly recurring 428 row, a total 430 row, and a select 432 row for the columns 416-422. A communication device user may select the "view invoice" text in the select 432 row to view an itemized invoice for a specific bill. The number and the types of graphs 402-412, the legend 414, the columns 416-422, and the rows 424-432 in FIG. 4 are exemplary.

The optimizer engine 126 may send the GUI 400 to the user interface 112 or the communication device 102 to assist a user in evaluating the current plan 304. For example, the costs graph 402 depicts the data in the legend 414, which indicates that the additional usage 424 has an average 422 of $39.33 for the bills dated for the preceding November, December, and January. The user may view the average 422 for the total 430 of $152.83 under the current plan 304 to determine whether to select the recommended plan 306.

Figure 5:
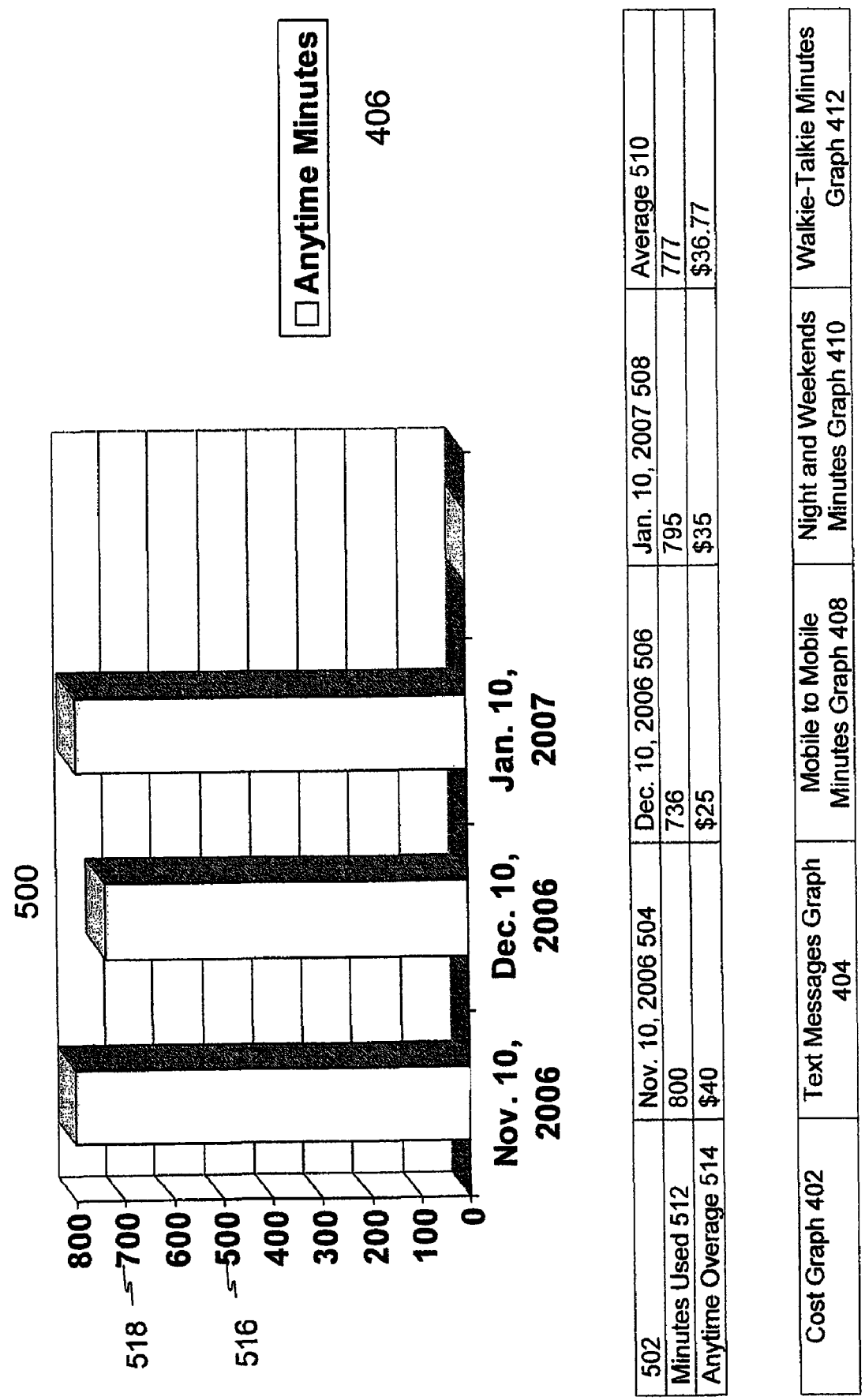
FIG. 5 illustrates a graphical user interface including a usage graph that illustrates usage data based on a previous service plan according to some embodiments of the present disclosure.

Turning now to FIG. 5, a graphical user interface 500 including a usage graph that illustrates usage data based on a previous service plan is depicted according to some embodiments of the present disclosure. The GUI 500 includes the anytime minutes graph 406, the costs graph 402, the text messages graph 404, the mobile to mobile minutes graph 408, the night and weekends minutes graph 410, the walkie-talkie minutes graph 412, and a legend 502 for the graph 406. The graphs 402-404 and 408-412 may be reduced in size relative to the anytime minutes graph 406, the same size as the anytime minutes graph 406, or simply buttons to select the viewing of the graphs 402-404 and 408-412. The legend 502 includes a Nov. 10, 2006 column 504, a Dec. 10, 2006 column 506, a Jan. 10, 2007 column 508, and an average 510 column. The legend 502 also includes a minutes used 512 row and an anytime overage 514 row for the columns 504-510. The anytime minutes graph 406 includes an anytime minutes limit 516 for a previous service plan and an anytime minutes limit 518 for the current plan 304. For example, the previous service plan had the limit 516 of 500 anytime minutes during the month of November, while the current plan 304 has the limit 518 of 700 anytime minutes during the month of January. The number and the types of graphs 402-412, the legend 502, the columns 504-510, and rows 512-514, and the limits 516-518 in FIG. 5 are exemplary.

The optimizer engine 126 may send the GUI 500 to the user interface 112 or the communication device 102 to assist a user in evaluating the current plan 304. For example, the anytime minutes graph 406 depicts the data in the legend 502, which indicates that the minutes used 512 has an average 510 of 777 for the bills dated for the preceding November, December, and January. The user may view the average 510 for the anytime overage 514 of $36.77 under the current plan 304 to determine whether to select the recommended plan 306.

Figure 6:
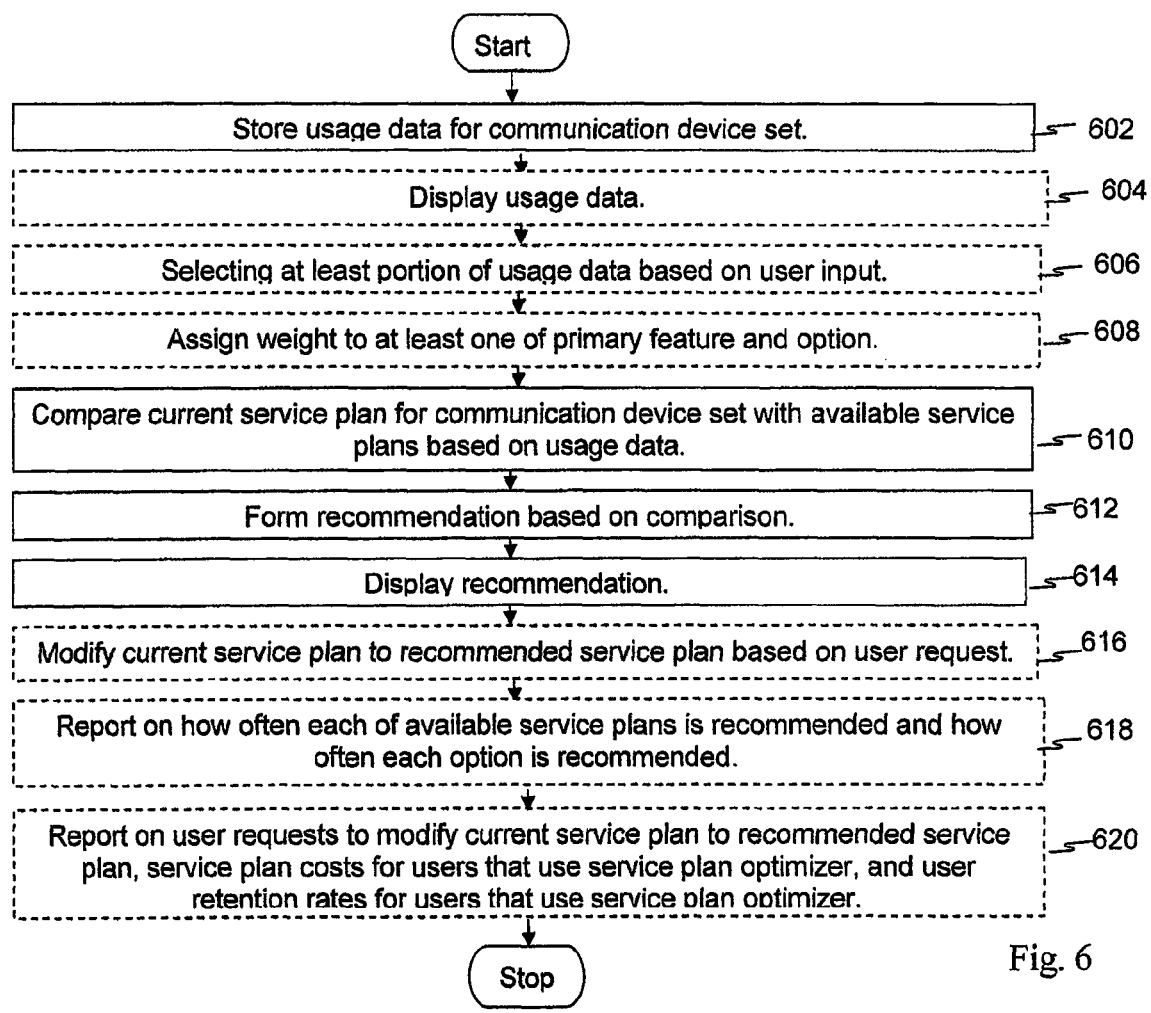
FIG. 6 is a flowchart of a method that might be used for a service plan optimizer according to some embodiments of the present disclosure.

An illustrative method for a service plan optimizer is depicted in FIG. 6. The optimizer engine 126 can execute the method to create and display recommendations for service plans to communication device users.

In box 602, usage data is stored for a communication device set, where the set includes one or more communication devices. For example, the storage device 124 stores the usage data 134 for the communication devices 102-106 in the group 110, which may be a group of mobile phones covered by a family plan.

In box 604, the usage data is optionally displayed based on a user input. For example, in response to a request for a service plan recommendation, the user interface 112 displays the usage data 134 for the group 110 during preceding year. Additionally, any user interface associated with any of the communication devices 102-106 may display the usage data 134. The displayed usage data 134 may be the GUI 200, which depicts the most recent year of service plan bills for the user. A communication service provider may prompt a user of a communication device to request a service plan recommendation via a communication with the user interface 112 or any user interface associated with the communication devices 102-106. Additionally, any user interface associated with any of the communication devices 102-106 may prompt a user with an option to request a service plan recommendation. Furthermore, a user may initiate the request process by accessing their service plan via the user interface 112 or any user interface associated with the communication devices 102-106.

In box 606, at least a portion of the usage data is optionally selected based on a user input. For example, the user selects the bills dated November, December, and January from the usage data 134 for the group 110 via the user interface 112 or any user interface associated with any of the communication devices 102-106. The user may select these months because the user may have added a phone for family member to the service plan in November, and may want the recommendation to be based on the portions of the usage data 134 for the group 110 that is indicative for future usage.

In box 608, a weighting factor or coefficient is optionally assigned to a primary feature and/or an option, wherein comparing the current service plan for the communication device set with available service plans based on the selected usage data is based at least in part on the weight. The user may assign different weights to various features and options to compare available service plans based on the weights assigned to the features and options. The optimizer engine 126 may recommend one available service plan if the user does not assign any weights to features and options, and may recommend a different service plan if the user assigns weights to features and options. For example, the user may assign a greater weight to the option for mobile to mobile 322 than the weight assigned to other options and features. The user may assign this greater weight in expectation of making a significant amount of calls from the user's communication device 102 to the family member's communication devices 104-106. The optimizer engine 126 will respond to the weight assignment by comparing service plans based on the usage data 134 for the group 110 and the weight assignment, thereby increasing the likelihood that the optimizer engine 126 will recommend service plans that do not include additional costs for mobile to mobile calls. In another example, the user may assign a greater weight to the value of avoiding overage charges and a lesser weight to the value of minimizing service plan price. For this example, the optimizer engine 126 will respond to the weight assignment by recommending service plans that significantly decrease the likelihood of overage charges, even if the increased price for such service plans would cost more than the projected overages. In effect, the user may input the weighting factor of a primary feature and/or option to tune the optimizer engine 126 to recommend a service plan more suited to their individual disposition and preferences.

In box 610, a current service plan for the communication device set is compared with available service plans based on the stored usage data. For example, the optimizer engine 126 compares the current plan 304 for the group 110 with the available service plans 132 based on the stored usage data 134 for the group 110. The optimizer engine 126 selects the current plan 304 from the active service plans 130 and loads the current plan into the normalization table 128. The optimizer engine 126 also loads the available service plans 132 into the normalization table 128. Additionally, the optimizer engine 126 selects the usage data 134 for the group 110 and loads the usage data 134 for the group 110 into the normalization table 128. The optimizer engine 126 uses the information loaded into the normalization table 128 to compare the service plans based on primary features and options, as described above in reference to FIG. 3.

The stored usage data 134 may be based on an average of the usage data, actual usage data, or standard deviation usage data. In an example of an average of the usage data, the average 510 of the minutes used 512 is 777, which may be used as the basis for calculating the total monthly cost 314 for both the current plan 304 and the recommended plan 306. In this example, a recommended service plan with 780 anytime minutes would project no overage charges because the projection of 777 anytime minutes for each month is always less than the limit of 780 anytime minutes.

In an example of the actual data, the minutes used 512 of 800 for Nov. 10, 2006 504, 736 for Dec. 10, 2006 506, and 795 for Jan. 10, 2007 508 may be used as the basis for calculating the total monthly cost 314 for both the current plan 304 and the recommended plan 306. The actual data indicates that the 800 anytime minutes for the November bill and the 795 anytime minutes for the January bill each exceed the 780 anytime minutes limit, which would result in projected overages for the service plan with the 780 anytime minutes limit. If the optimizer engine 136 projects an overage for two-thirds of the months under a service plan with a limit of 780 anytime minutes, the optimizer engine 136 may recommend a service plan with a limit of 800 anytime minutes. The optimizer engine 136 does not project any overages for the service plan with the 800 anytime minutes limit when using the actual data of 800, 736, and 777 anytime minutes.

In an example of the standard deviation data, the standard deviation of 800, 736, and 795 is calculated as 29 with the average 510 of 777. The optimizer engine 136 uses a normalized distribution curve table to project that a normalized distribution with a mean of 777 and a standard deviation of 29 exceeds one standard deviation above the mean, or 796 (777+ 29=796), approximately 15.8% of the time. This standard deviation projection results in projected overages for the service plan with the 800 anytime minutes limit approximately 15% of the time. If the optimizer engine 136 projects an overage for approximately 15% of the months under a service plan with a limit of 800 anytime minutes, the optimizer engine 136 may recommend a service plan with a limit of 825 anytime minutes. Using the standard deviation data with a mean of 777 and two standard deviations (777+29+29=825), the optimizer engine 136 projects overages for the service plan with the 825 anytime minutes limit approximately only 2.2% of the time. The optimizer engine 126 may compare the current service plan with available service plans based on standard deviation data or user selected conditions for standard deviation data. For example, instead of projecting overages 15% of the time based on the standard deviation and the mean for the selected usage data, the user may select to review recommended service plans based on a future usage that averages one standard deviation (29) above the mean (777) every month, which is an average of 796 minutes for each month. In this situation, the user is less concerned about occasional costs for occasional overages than about the monthly costs for higher regular usages that may be reasonable expected.

In box 612, a recommendation is formed based on the comparison. For example, the optimizer engine 126 forms a recommendation based on the comparison of the current plan 304 to the recommended plan 306. The recommendation may include a cost under the current service plan and a projected cost under a recommended service plan, such as the total monthly cost 314 for the current plan 304 of $94.00 and the total monthly cost 314 for the recommended plan 306 of $69.99.

The recommendation may include a suggestion to discontinue an option. For example, if the usage data 134 for the group 110 indicates that a user sent only 5 text messages during the prior year, the recommendation may suggest to discontinue the $10.00 monthly fee for 300 text messages each month because the user would reduce costs by paying for 5 annual text messages on an individual basis.

The recommendation may include different scenarios based on projected usage data. For example, a user plans to give their child a communication device as a birthday gift, and the user anticipates that the child will use the communication device to download approximately 30 music videos each month. The user may modify the usage data that is used for comparisons so that recommended service plans will reflect this anticipated usage of downloading 30 music videos each month.

The recommendation may be based on a promotional offer for a recommended service plan. For example, a communication service provider may offer a service plan with three initial months of significantly reduced costs only to users whose service plans will expire within six months.

The recommendation may include a recommended service plan based on users with similar usage data. For example, if the optimizer engine 126 identifies twelve different service plans that are projected to save the user between $20.00 and $30.00 each month, the optimizer engine 126 may initially display the recommended service plans that are most often chosen by other users with similar usage patterns.

The recommendation may include a suggestion to remove a communication device from the current service plan for the group of communication devices. For example, a husband and wife who seldom use their communication devices may reduce their total service plan costs by selecting an individual high usage service plan for their child and switching their current family plan to a low usage family plan.

The recommendation may include a suggestion to add a communication device to the current service plan for the group of communication devices. For example, a husband and wife who are in a family service plan may reduce their service plan costs by switching their child from an individual service plan initiated by a grandparent to the current family service plan.

The recommendation may include a suggestion to obtain a communication device model that is compatible with a recommended service plan. For example, the recommendation may suggest for a user who has recently increased their data communications significantly to consider upgrading to a more expensive communication device 102 that offers faster data communications.

In box 614, the recommendation is displayed. For example, the user interface 112 displays the GUI 300, which includes the recommended plan 306. Additionally, any user interface associated with the communication devices 102-108 may display the GUI 300. The user interface 112 may display the recommendation using multiple usage graphs, such as the graphs 402-412. The user interface 112 may display the recommendation using a usage graph that depicts usage data based on a previous service plan, such as the anytime minutes graph 406 with the limit 516 of 500 anytime minutes during the month of November and the limit 518 of 700 anytime minutes during the month of January.

The user may decide to compare the displayed recommendations to alternative recommendations by selecting different usage data and/or by assigning different weights to features and options. In response to this decision, the method may return to box 606 for the user to select different usage data that may be more representative for future usage or to box 608 for the user to assign different weights. Continuing this example, the method executes box 610 to compare the current service plan with available service plans based on the different usage data and/or the different weights, and executes box 612 to form a different recommendation based on the different usage data and/or the different weights. The method executes box 614 to display the different recommendation.

In box 616, the current service plan is optionally modified to a recommended service plan based on a user request. For example, the user discontinues subscription to the current plan 304 and begins subscription to the recommended plan 306 via the user interface 112 or any user interface associated with the communication devices 102-108.

In box 618, how often each of the available service plans is recommended and how often each option is recommended is optionally reported. For example, the user interface 114 reports to an administrator on how often each of the available service plans 132 is recommended and how often each of the options is recommended by the optimizer engine 126 to identify which plans and which options most closely match the usage data 134 for the users of the service plan optimizer. This recommendation report may assist the administrator in developing new plans and options and in discontinuing old plans and options.

In box 620, a report is optionally produced based on user requests to modify the current service plan to a recommended service plan, service plan costs for users that use the service plan optimizer, and user retention rates for users that use the service plan optimizer. For example, the user interface 114 reports to the administrator on the frequency that users request to modify their current service plan to recommended service plans, such that the administrator may evaluate the persuasiveness of the recommendations. If users are not selecting recommended plans that offer specific benefits, the administrator may redesign the recommendation to call more attention to the specific benefits, such as by highlighting the benefits or displaying the benefits in a different color, font, or size.

The user report may also include service plan costs for users that use the service plan optimizer, such as subsequent service plan costs for users who used the service plan optimizer but declined to select any of the recommended plans. The user report may also compare projected savings for users who selected a recommended plan with the subsequent costs for the users, which indicates whether users who switched plans reduced service plan costs and how closely projected savings estimated the actual savings.

Furthermore, the user report can indicate user retention rates for users that use the service plan optimizer, users that switch to a recommended plan and reduce costs, users that switch to a recommended plan and do not reduce costs, and users that do not use the service plan optimizer. Such a user report may help the administrator evaluate the service plan optimizer's effectiveness at user retention. This user report may also assist in identifying the types of users and the types of the usage data that resulted in less accurate saving estimations such that subsequent savings estimations may be improved.

The system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices.

These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 792 is shown, multiple processors may be present. Thus, while instructions may be discussed as executed by a processor, the instructions may be simultaneously, serially, or other be executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:
1. A service plan optimizer, comprising:
a storage device to store usage data for a communication device;
a processor;
an optimizer engine executed by the processor to compare a current service plan for the communication device with available service plans based on the stored usage data, and to form a recommendation based on the comparison;

a first user interface to display the recommendation and to receive a user request to modify the current service plan to a recommended service plan based on the recommendation; and a second user interface to report on how often each of the available service plans is recommended and how often each option is recommended and to report on user requests to modify the current service plan to a recommended service plan, service plan costs for users that use the service plan optimizer, and user retention rates for users that use the service plan optimizer.

2. The service plan optimizer of claim 1, wherein the usage data comprises data associated with at least one of usage history, text messages, roaming calls, anytime minutes, mobile to mobile minutes, nighttime and weekend minutes, walkie-talkie minutes, and long distance calls.

3. The service plan optimizer of claim 1, wherein the stored usage data is based on at least one of an average of the usage data, actual usage data, and standard deviation usage data.

4. The service plan optimizer of claim 1, wherein the optimizer engine loads the current service plan, the available service plans, and the stored usage data into a normalization table to compare service plans based on primary features and options.

5. The service plan optimizer of claim 1, wherein the user interface is further configured to modify the current service plan to a recommended service plan based on a user request.

6. The service plan optimizer of claim 1, wherein the recommendation comprises a cost under the current service plan and a projected cost under a recommended service plan, based on the stored usage data.

7. The service plan optimizer of claim 1, wherein the recommendation comprises a suggestion to discontinue an option.

8. The service plan optimizer of claim 1, wherein the recommendation comprises different scenarios based on projected usage data.

9. The service plan optimizer of claim 1, wherein the recommendation is further based on a promotional offer for a recommended service plan.

10. The service plan optimizer of claim 1, wherein the recommendation comprises a recommended service plan based on users with similar usage data.

11. The service plan optimizer of claim 1, wherein the user interface displays the recommendation using multiple usage graphs.

12. The service plan optimizer of claim 1, wherein the user interface displays the recommendation using a usage graph that depicts usage data based on a previous service plan.

13. A computer implemented method for a service plan optimizer, comprising:
storing usage data for a communication device;
displaying the usage data;
selecting at least a portion of the usage data based on a user input;
comparing a current service plan for the communication device with available service plans based on the selected usage data;
forming a recommendation based on the comparison;
displaying the recommendation;
modifying the current service plan to a recommended service plan based on a user request;
reporting on how often each of the available service plans is recommended and how often each option is recommended; and
reporting on user requests to modify the current service plan to a recommended service plan, service plan costs for users that use the service plan optimizer, and user retention rates for users that use the service plan optimizer.

14. The computer implemented method of claim 13, further comprising assigning a weight to at least one of a primary feature and an option, wherein comparing the current service plan for the communication device with available service plans based on the selected usage data is based at least in part on the weight.

15. A service plan optimizer, comprising:
a storage device to store usage data for a group of communication devices;
a first user interface to display the usage data and to select at least a portion of the usage data based on a user input;
a processor;
an optimizer engine executed by the processor to compare a current service plan for the group of communication devices with available service plans based on the selected usage data, and to form a recommendation based on the comparison; and
a second user interface to report on how often each of the available service plans is recommended and how often each option is recommended and to report on user requests to modify the current service plan to a recommended service plan, service plan costs for users that use the service plan optimizer, and user retention rates for users that use the service plan optimizer;
wherein the first user interface is further configured to display the recommendation and to receive a user request to modify the current service plan to a recommended service plan based on the recommendation.

16. The service plan optimizer of claim 15, wherein the recommendation comprises a suggestion to remove a communication device from the current service plan for the group of communication devices.

17. The service plan optimizer of claim 15, wherein the recommendation comprises a suggestion to add a communication device to the current service plan for the group of communication devices.

18. The service plan optimizer of claim 15, wherein the recommendation comprises a suggestion to obtain a communication device model that is compatible with a recommended service plan.

* * * * *